Dec. 8, 1970  E. E. BANKSTON  3,545,143

THEATER CONSTRUCTION

Filed Feb. 6, 1969  2 Sheets-Sheet 1

Earl F. Bankston
INVENTOR.

BY Clarence A.O'Brien
and Harvey B. Jacobson
Attorneys

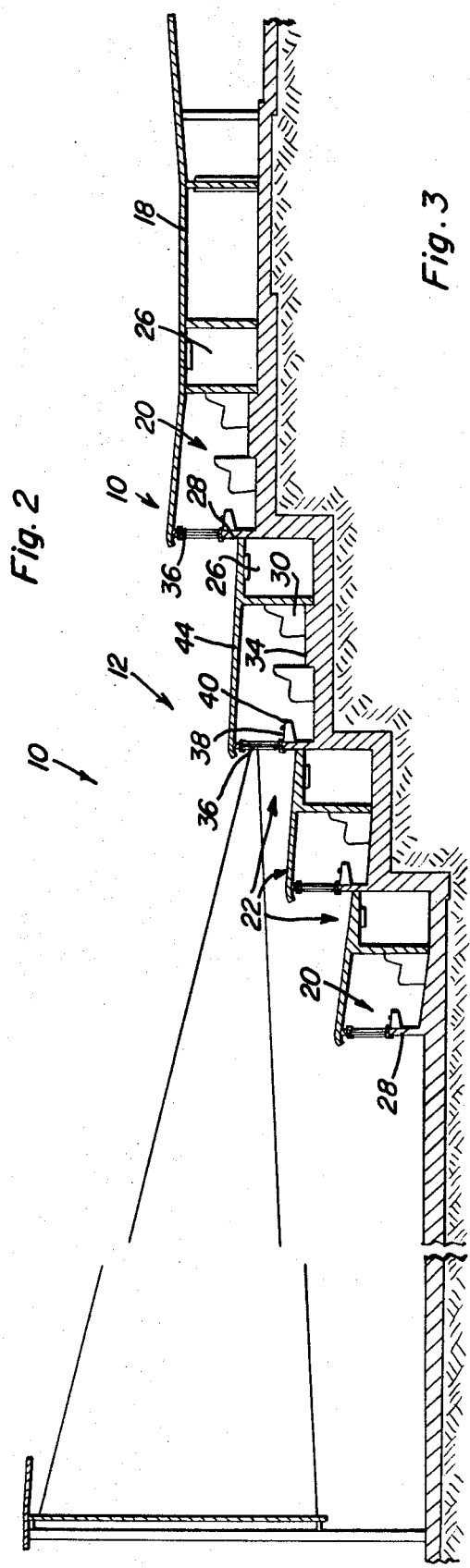
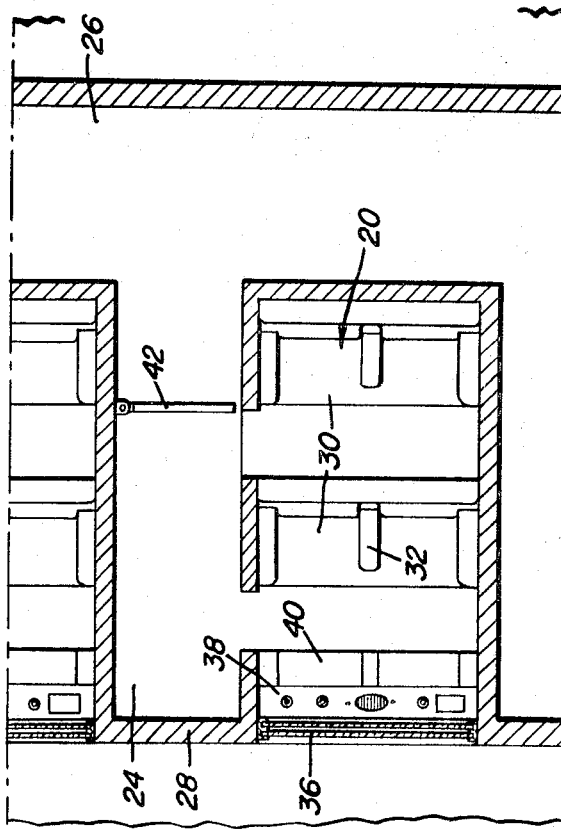
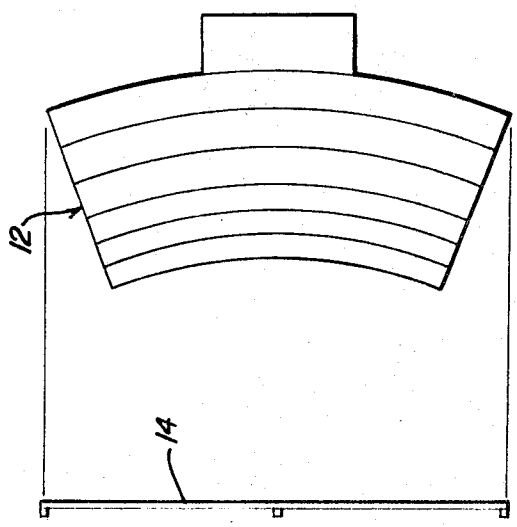

United States Patent Office

3,545,143
Patented Dec. 8, 1970

3,545,143
THEATER CONSTRUCTION
Earl E. Bankston, 1310 Hollywood Drive,
Jackson, Tenn. 38301
Filed Feb. 6, 1969, Ser. No. 796,952
Int. Cl. E04h 3/10
U.S. Cl. 52—6      3 Claims

ABSTRACT OF THE DISCLOSURE

A theater wherein the audience is seated within separate viewing booths arranged in tiers. Each of the tiers is located immediately to the rear of the adjacent lower tier and elevated approximately four feet thereabove. The booths, as well as the access ramps and hallways thereto, are roofed while the screen, located forward of the tiers can be located outdoors in the nature of a drive-in movie screen or can be enclosed within a roof-like structure which extends from the tiered booths to the top of the screen.

---

The instant invention is generally concerned with theaters, and more particularly relates to theater construction wherein the viewing audience is seated within private viewing booths adapted, depending upon the specific size of the booth, to seat from two to six people.

It is a primary object of the instant invention to provide a theater construction wherein the members of the audience are assured of complete privacy and hence the elimination of the inconveniences and annoyances normally encountered in attending a movie or the like. For example, the viewer will be seated only with his own party and will not be required to squeeze by or have others force their way by him to obtain a seat. By the same token, the viewer will not be subjected to distracting talking by other members of the audience or other annoyances arising from close contact with large groups of strangers.

Another significant object of the instant invention resides in the provision of a theater wherein the individual viewers or members of the audience can control the temperature of their separate viewing booth, as well as the lighting therein and the volume of the sound. Likewise, it is contemplated that each booth, for the comfort and convenience of the patrons, be provided with a shelf upon which snacks, drinks and the like can be placed.

In achieving the objects desired, the instant invention contemplates the provision of a series of individual viewing booths arranged in tiers with each tier being located immediately behind and approximately four feet higher than the lower tier forward thereof. Each booth is to be completely enclosed and include an enlarged viewing window in the forward face thereof so as to provide a clear view of the forwardly located screen or stage by the occupants of the booths. Covered ramps and hallways will lead to the booths which in turn will be provided with individual temperature, and light controls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a transverse cross-sectional view taken substantially on a plane passing along line 2—2 in FIG. 1;

FIG. 3 is an enlarged plan detail illustrating a typical booth layout; and

FIG. 4 is a schematic plan view illustrating an alternate layout wherein the tiers are curved for achieving maximum visibility with regard to the screen.

Figure 1:
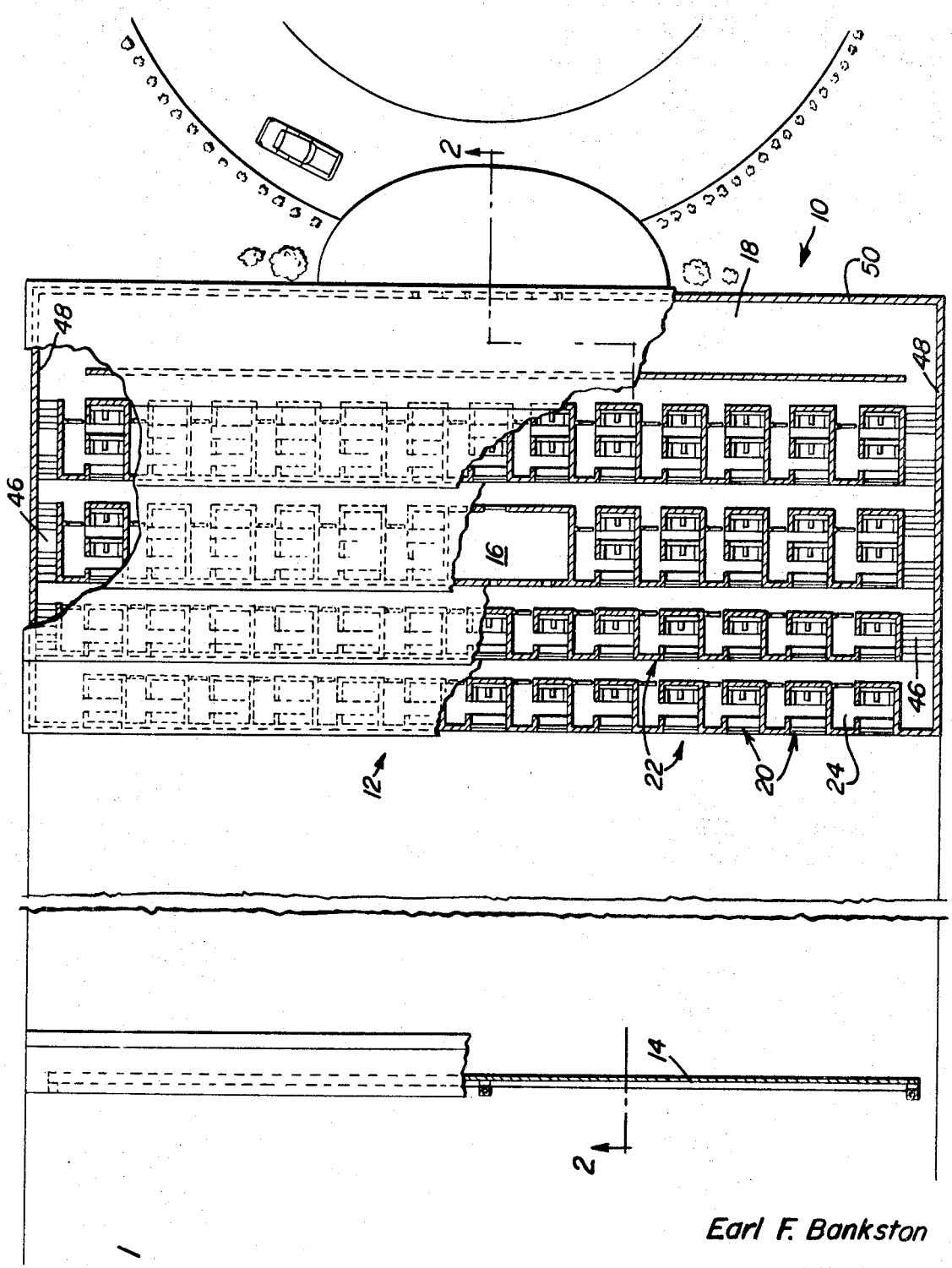
FIG. 1 is a plan view of a typical theater layout, with portions broken away for purposes of illustration, incorporating the features of the instant invention.

Referring now more specifically to the drawings, reference numeral 10 is used to designate a theater constructed in accordance with the instant invention. This theater will include an audience seating area 12 and a forwardly located viewing screen 14. The audience seating area 12 is formed, aside from an appropriately located projection booth 16 and lobby area 18, of a series of individual viewing booths 20 arranged in elongated tiers or progressively elevated rows 22.

The basic booth 20 includes a short passageway 24 extending along one side from the rearwardly located access hallway 26 to the front wall 28. Extending laterally from the passage 24, to the opposite side of the booth, are either one or two double seats 30 for the seating of the patrons. It is contemplated that each of the double seats 30 be provided with a retractable center armrest 32 for the accommodation of a third person on the seat 30 upon a retraction of the armrest divider 32. It will also of course be appreciated that regular theater seats can be used. In those booths wherein two double seats 30 are provided, noting FIG. 2 in particular, the rear seat will have the floor level 34 thereof orientated one step up so as to allow for a clear viewing of the stage or screen area by the occupants of the rear booth seat 30. Further, the seat floors in those booths generally below the screen will be inclined so as to slightly rearwardly incline the seats and facilitate a viewing of the screen, note FIG. 2. An enlarged observation window 36 is provided in the front wall 28 of the booth and so orientated as to provide a clear viewing of the screen area by the occupants of the booth 20.

It is contemplated that a control panel 38 be provided across the front of the booth 20 below the observation window, this panel 38 incorporating individual controls for adjusting the sound within the booth, as well as the lighting and temperature. Other features can of course be incorporated therein including signalling means to a central service area. Also, it is contemplated that a shelf 40 be provided upon which snacks, beverages and the like can be placed for consumption by the occupants of the booth during the performance.

Privacy is insured within the individual booths 20 by the provision of a door 42, preferably of the swinging type, across the passage 24 toward the hallway end thereof. Further, it will of course be appreciated that solid and substantially soundproof walls are provided about each booth along with an appropriate roof structure 44.

Access to all of the booths 20 in any one row or tier 22 is achieved by means of the hallway 26 which extends continuously along the row 22 immediately behind the booths 20 therein so as to actually combine with the booths 20 in the formation of the tier 22. Noting FIG. 2 in particular, it will be appreciated that each tier 22, including the booths 20 and communicating hallway 26, is located to the rear and elevated relative to the tier 22 immediately forward thereof. It is contemplated that the elevational difference between the tiers be approximately four feet, such being considered a sufficient height so as to provide for, through the associated observation windows 36, a clear viewing of the screen area from the booths of each tier over the forward lower tiers. By the same token, the over-all height of the audience seating area 12 can be kept at a minimum so as to allow for the accommodation of a maximum number of tiers 22.

Access to the various tiers 22, and particularly the booth communicating hallways 26 associated therewith, is provided for by ramps 46 which will preferably be stepped as illustrated in FIG. 1. Incidentally, while FIG. 1 illustrates the provision of two ramps 46, one along either side of the audience area 12, it will be appreciated that centrally located ramps can also be provided as needed.

With continued reference to FIG. 1, as well as FIG. 2, it will be appreciated that the booth roof construction 44 is in fact continuous along not only all of the booths 20 which comprise a single row 22, but also over the communicating hallway 26 and the corresponding portions of the ramps 46, this roof construction being appropriately weather-sealed to the front wall structure of the row of booths immediately thereabove at a height just below the observation windows 36 of the upper row of booths, thus providing what might in effect be considered a stepped exterior appearance to the audience section 12 of the theater 10. Appropriate side walls 48, as well as a lobby enclosing front wall 50 will also be provided so as to completely enclose the area 12. The roof construction associated with the uppermost tier or booths can, depending upon the particular appearance sought, be formed so as to continue over the lobby area 18.

The projection booth 16 has been illustrated as located centrally within an intermediate tier 22. However, the location of this projection booth can be varied depending upon the number of tiers present, the height of the screen, and any problems of access to the booth which will have to be considered. The screen 14 itself can be located outdoors, much in the manner of a drive-in movie screen. In such case, the booth roofs will overhang the front walls to provide a rain cover therefor. However, it is also contemplated that the theater 10 be adapted for daytime as well as nighttime use, and as such, a lightweight roof structure can be provided so as to overlie and enclose the area between the screen and the audience. As one example, steel suspension cables can be extended from the top of the screen supporting structure to the roof area of the uppermost tier and an appropriate flexible, or for that matter rigid, cover supported thereon. By the same token, if deemed necessary, appropriate side walls can be provided between the screen and audience areas.

With reference to FIG. 4 such illustrates a theater incorporating the tiers and the individual booths of the instant invention wherein the tiers ar arcuate or curved so as to afford maximum visibility of the stage area by the occupants of the booths. By the same token, other variations or layouts are of course contemplated utilizing the instant invention. For example, twin theaters can be provided with a central lobby located beneath a double screen, to the opposite sides of which rise two separate audience areas. Another contemplated arrangement involves a pair of audience areas sloping outwardly and downwardly in opposed directions for a viewing of a pair of outwardly locating screens facing each other. Another factor which should be appreciated is that while a movie theater and screen have been specifically referred to, actually the invention could be adapted to a theater incorporating a stage for live productions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a theater, an audience area, said audience area comprising a plurality of individual viewing booths, said booths being arranged in a plurality of rows, said rows being orientated in generally parallel relation to each other, one behind the other from a first front row, with each row, aside from the first row, being elevated relative to the row immediately forward thereof, an elongated hallway associated with and extending along each row of booths for access thereto, each booth being only communicated directly with said hallway and otherwise completely separated from the adjacent booths, at least one elongated ramp communicating said hallways with each other, each booth including a front wall, at least a portion of which is orientated vertically above the booths in the row immediately forward thereof, the forward wall of each booth including an enlarged transparent viewing window therein opening above the booths in the row immediately forward thereof, each booth including a seat therein in alignment with the viewing window, and a control panel including means for varying certain conditions within the booth, a selectively openable door between the interior of each booth and the communicating hallway, each row of booths rearward of the first row being elevated, relative to the row immediately forward thereof, to a height less than the full height of the booths therein, and a continuous roof being provided over all of the booths in each row, the roofs over said rows forming, in conjunction with the front walls of the booths, a continuous covering for the audience area.

2. In a theater, an audience area, said audience area comprising a plurality of individual viewing booths, said booths being arranged in a plurality of rows, said rows being orientated in generally parallel relation to each other, one behind the other from a first front row, with each row, aside from the first row, being elevated relative to the row immediately forward thereof, an elongated hallway associated with and extending along each row of booths for access thereto, each booth being only communicated directly with said hallway and otherwise completely separated from the adjacent booths, at least one elongated ramp communicating said hallways with each other, each booth including a front wall, at least a portion of which is orientated vertically above the booths in the row immediately forward thereof, the forward wall of each booth including an enlarged transparent viewing window therein opening above the booths in the row immediately forward thereof, each row of booths rearward of the first row being elevated, relative to the row immediately forward thereof, to a height less than the full height of the booths therein, and a continuous roof being provided over all of the booths in each row, the roofs over said rows forming, in conjunction with the front walls of the booths, a continuous covering for the audience area.

3. In a theater, an audience area, said audience area comprising a plurality of individual viewing booths, said booths being arranged in a plurality of rows, said rows being orientated in generally parallel relation to each other, one behind the other from a first front row, with each row, aside from the first row, being elevated relative to the row immediately forward thereof, each row of booths rearward of the first row being elevated, relative to the row immediately forward thereof, to a height less than the full height of the booths therein, and a continuous roof overlying each row of booths, providing in effect a series of stepped roofs, each row of booths including a front wall, the row roofs combining with the row front walls so as to define a continuous cover for the audience area.

References Cited

UNITED STATES PATENTS

| | | | |
|---|---|---|---|
| 844,127 | 2/1907 | Helbig | 52—8 |
| 1,787,814 | 1/1931 | Chersanaz | 52—8 |
| 2,102,718 | 12/1937 | Josserand | 52—6 |
| 2,146,103 | 2/1939 | Williamson | 52—6 |
| 2,241,830 | 5/1941 | Tourtellotte | 52—185 |

JOHN E. MURTAGH, Primary Examiner

U.S. Cl. X.R.

52—173, 182, 236